United States Patent [19]

Koda et al.

[11] Patent Number: 5,681,520
[45] Date of Patent: Oct. 28, 1997

[54] METHOD OF MOLDING LARGE CONTAINERS BY THE PROCESS OF STRETCH BLOW MOLDING

[75] Inventors: Hideaki Koda, Ueda; Hisashi Nakajima, Sakakimachi, both of Japan

[73] Assignee: A.K. Technical Laboratory, Inc., Nagano-ken, Japan

[21] Appl. No.: 531,737

[22] Filed: Sep. 21, 1995

[30] Foreign Application Priority Data

Sep. 26, 1994 [JP] Japan .................................. 6-256216

[51] Int. Cl.⁶ .................................................. B29C 49/18
[52] U.S. Cl. ........................ 264/520; 264/526; 264/530; 425/530; 425/538; 425/529
[58] Field of Search ........................ 264/520, 521, 264/526, 529, 530, 532; 425/526, 529, 530, 538

[56] References Cited

U.S. PATENT DOCUMENTS

| | | | |
|---|---|---|---|
| 3,776,991 | 12/1973 | Marcus | 264/520 |
| 3,979,491 | 9/1976 | Zavasnik | 264/520 |
| 4,155,974 | 5/1979 | Valyi | 264/520 |
| 4,235,837 | 11/1980 | Noonan | 264/520 |
| 4,333,905 | 6/1982 | Hestehave et al. | 264/529 |
| 4,364,721 | 12/1982 | Rainville | 425/149 |
| 4,547,333 | 10/1985 | Takada | 264/532 |
| 4,615,667 | 10/1986 | Roy | 264/526 |
| 5,474,735 | 12/1995 | Krishnakumar et al. | 264/526 |

FOREIGN PATENT DOCUMENTS

| | | | |
|---|---|---|---|
| 2256819 | 8/1975 | France . | |
| 229174 | 12/1982 | Taiwan . | |
| 1598496 | 9/1981 | United Kingdom . | |
| 2139551 | 11/1984 | United Kingdom | 264/532 |
| 2150488 | 7/1985 | United Kingdom . | |

Primary Examiner—Catherine Timm
Attorney, Agent, or Firm—Ostrolenk Faber Gerb & Soffen, LLP

[57] ABSTRACT

There is provided a method of molding a large container including the steps of preparing a preform from an injection-molded, thick-wall, closed-end parison by repeatedly and intermittently applying an air blow pressure to the parison and releasing the air blow pressure therefrom, and stretch blow molding the preform to a thin-wall large container. The closed-end parison is released from a mold immediately after a skin layer, keeping a parison shape, is formed on the surface of the closed-end parison having a high inner temperature, and is then molded to a preform with a preform mold heated to a predetermined temperature, while the surface temperature of the parison is increased by the inner temperature. The preform is kept at a stretch blow molding temperature and is stretch blow molded into a blow mold to produce a large container.

4 Claims, 4 Drawing Sheets

METHOD OF MOLDING LARGE CONTAINERS BY THE PROCESS OF STRETCH BLOW MOLDING

BACKGROUND OF THE INVENTION

1. Field of the Invention

The present invention relates to a method of molding large containers having a thin-wall body from an injection-molded, thick-wall closed-end parison by the process of stretch blow molding.

2. Background Art

It is extremely difficult, because of the desired degree of orientation and other reasons, to mold a large container (for example, a 20-liter bottle) having a thin-wall body from an injection-molded, closed-end parison by direct stretch blow molding. A conventional method thus prepares a relatively large preform as an intermediate from the closed-end parison before finally forming a large container.

In actual procedures, when the thickness of the wall of the closed-end parison is remarkably greater than usual (=not greater than 4 mm), conventional air blowing tends to cause a non-uniform section in the preform. This tendency is especially observed in resins which do not have self-healing properties, which polyethylene terephthalate has. Stretch blow molding the preform having such a non-uniform section into a large container results in a significant non-uniformity of the wall thickness distribution of the resulting large container, which may cause critical damage in the molding or forming process.

Polyethylene terephthalate having a wall thickness of greater than 5 mm suffers from whitening, and injection molding a closed-end parison having the greater wall thickness is thus not suited to form a large container by stretch blow molding. The conventional method thus requires a rather complicated process including the steps of: preparing a dual-structured, thick-wall closed-end parison by two-step injection molding; and stretch blow molding the thick-wall closed-end parison into a large container after temperature control.

The conventional method is thus not applicable to form a large container, for example, a 20-liter bottle, by the process of stretch blow molding, although it is possible to form a relatively large container from an injection-molded closed-end preform.

SUMMARY OF THE INVENTION

One object of the present invention is thus to provide a method of preparing a preform having a uniform wall thickness distribution from a closed-end parison and easily forming a large container form the preform by the process of stretch blow molding as well as to provide an apparatus for the same.

Another object of the present invention is to provide a method of forming a large container by the process of stretch blow molding, which is not significantly different from the conventional method but only adopts a different way of air blowing.

The above and the other related objects are realized by a method including the steps of: preparing a preform from an injection-molded, thick-wall closed-end parison by repeatedly and intermittently applying an air blow pressure to the parison and releasing the air blow pressure therefrom, where the preform has a greater diameter and a thinner wall thickness than the closed-end parison; and stretch blow molding the preform to a thin-wall large container.

The closed-end parison is released from a mold immediately after a skin layer keeping a parison shape is formed on the surface of the closed-end parison having a high inner temperature. The closed-end parison is then molded to a preform with a preform mold heated to a predetermined temperature, while the surface temperature of the parison is increased by an internal heat of the parison. The preform kept at a stretch blow molding temperature is stretch blow molded in a blow mold to produce a large container.

According to the method of the present invention, part of the closed-end parison is expanded by application of an air blow pressure, which results in reducing the wall thickness and decreasing the internal heat of the expanded part. Release of the air blow pressure gets rid of the internal resistance and accordingly causes a contraction, which is less than the expansion but returns the wall thickness of the expanded part to an extent corresponding to the degree of contraction. The expanded and subsequently contracted part has less internal heat than that of the residual part. Thus next application of air blow pressure expands another part by a greater degree than that of the expanded and subsequently contracted part.

Repeated application of air blow pressures successively expands respective parts of the closed-end parison to finally expand the whole parison. This effectively prevents critical damage and significant deformation of the parison due to the partial expansion and gives a preform which is easily molded to a large container.

Repeated expansion and contraction of respective parts of the parison through the intermittent application and release of air blow pressures easily gives a preform, even when material applied is a resin which does not have self-healing properties, which polyethylene terephthalate has. The preform is then blown to a large container having a uniform wall thickness distribution.

These and other objects, features, aspects, and advantages of the present invention will become more apparent from the following detailed description of the preferred embodiment with the accompanying drawings.

DETAILED DESCRIPTION OF THE PREFERRED EMBODIMENTS

Figure 1:
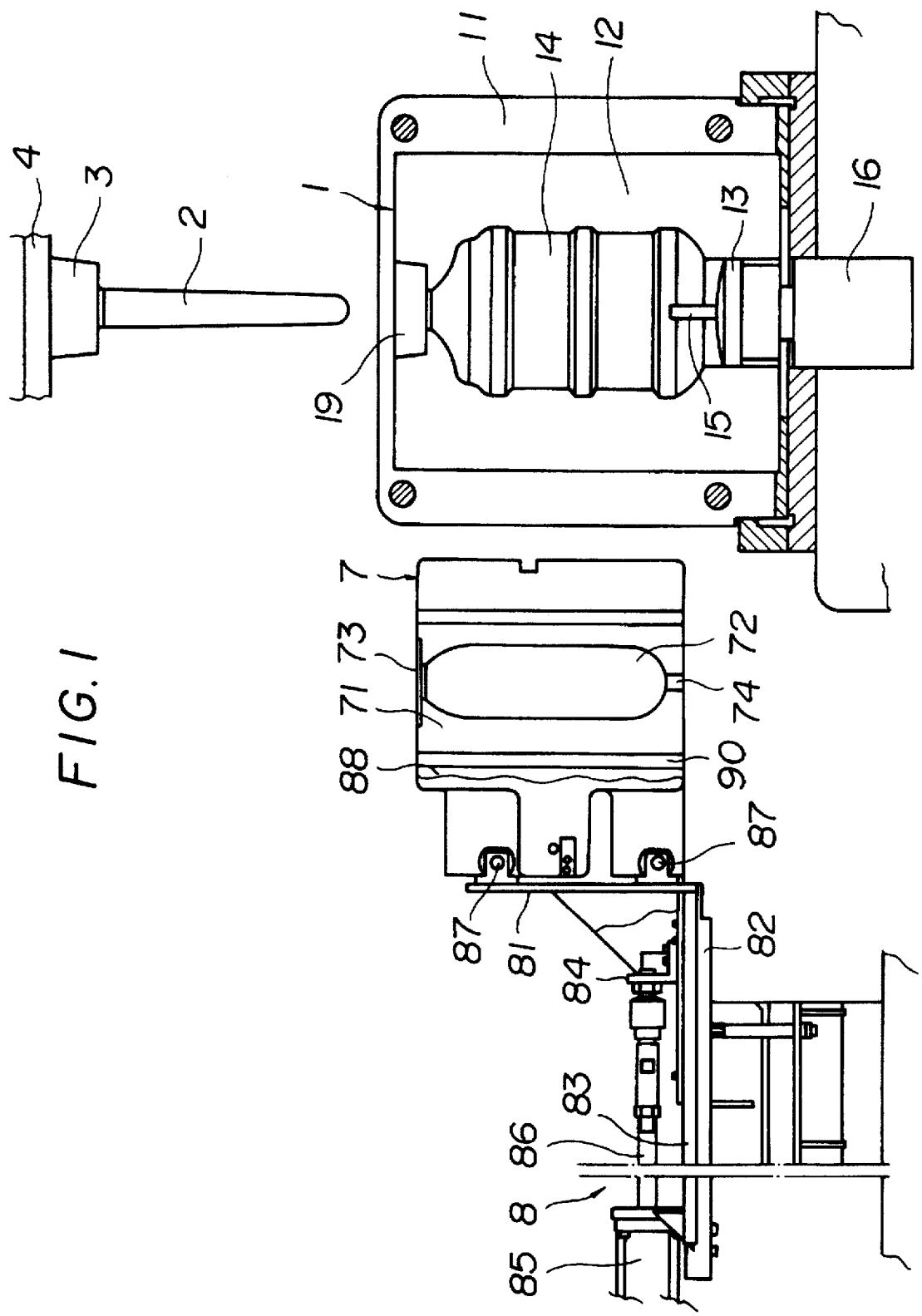
FIG. 1 is a partially cross-sectional, front view illustrating a molding device in the open state, which is applicable to stretch blow molding of a large container according to the method of the present invention.
Figure 2:
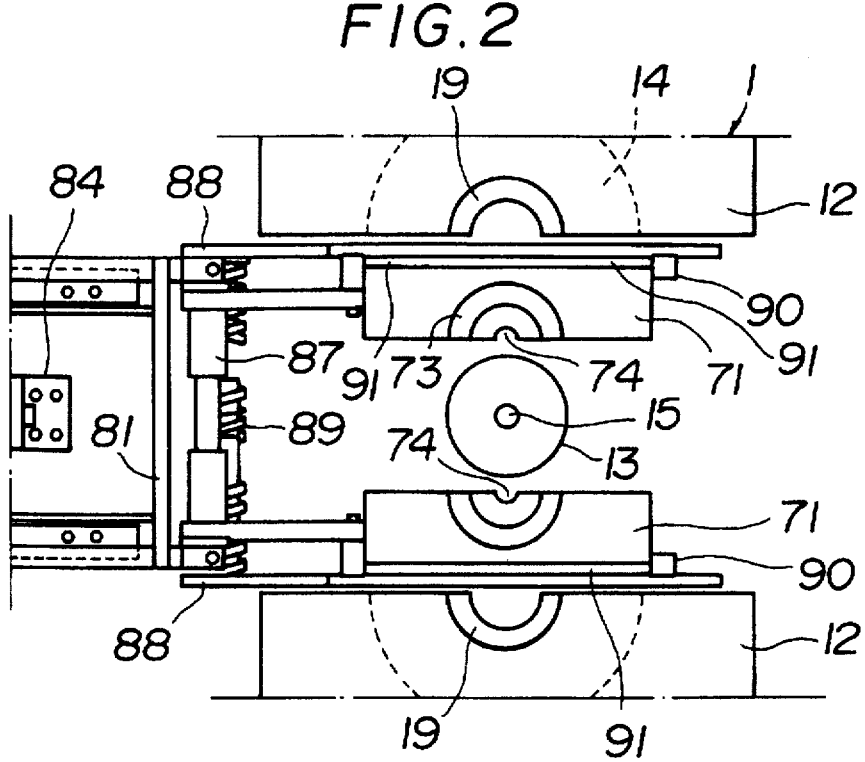
FIG. 2 is a plan view illustrating an essential part of the molding device, where a preform mold is inserted between halves of blow mold.
Figure 3:
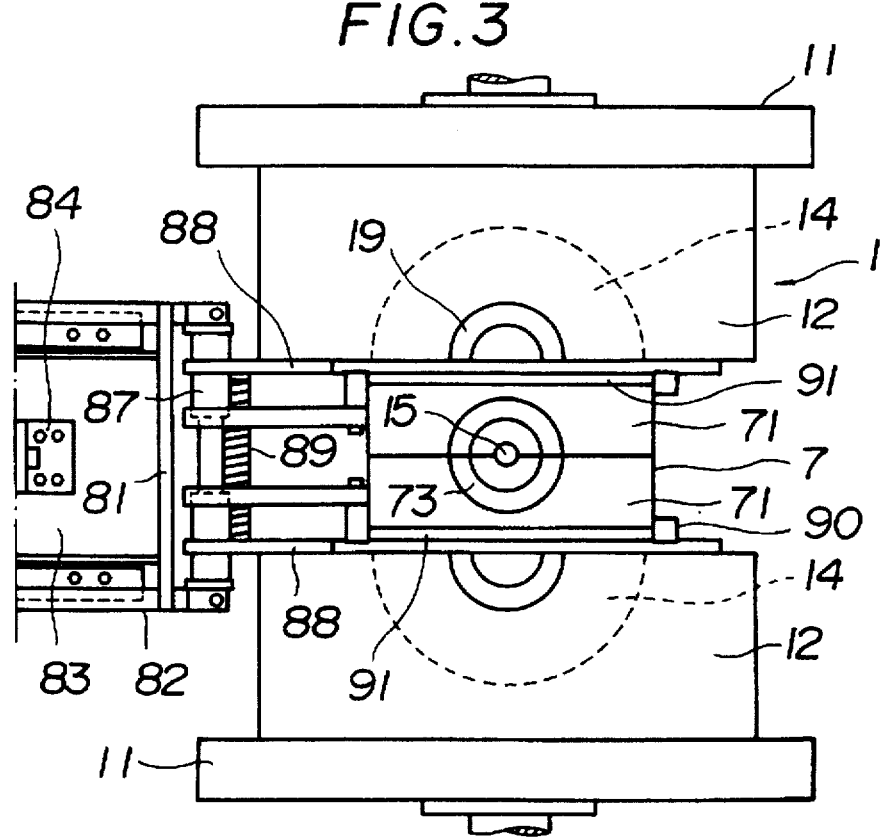
FIG. 3 is a plan view illustrating the essential part of the molding device, where the halves of blow mold are closed while inserting the preform mold.
Figure 4:
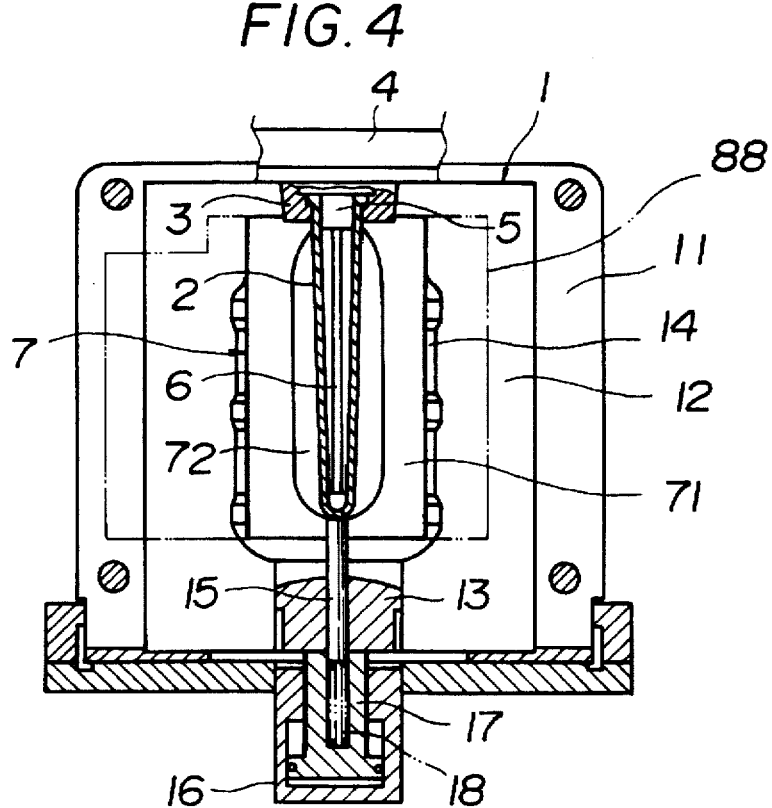
FIG. 4 is a vertical cross sectional view schematically illustrating a process or molding a preform.
Figure 5:
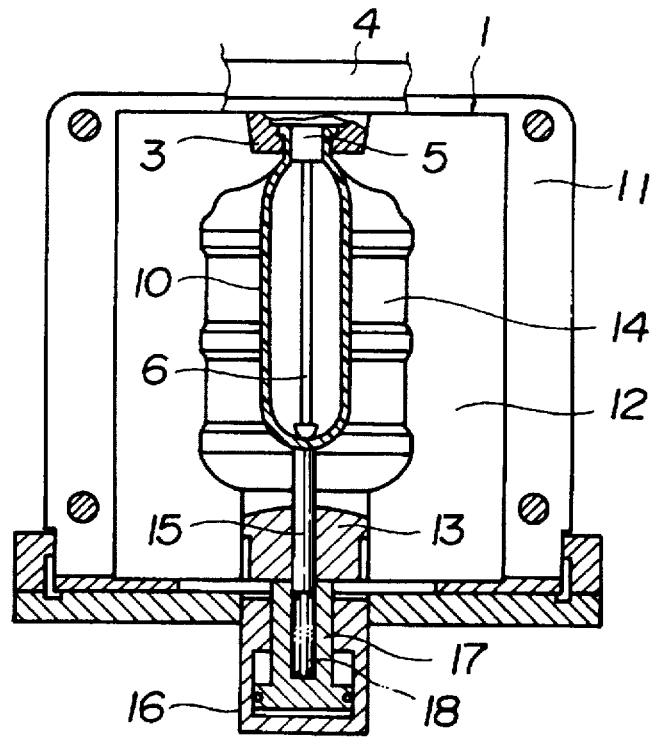
FIG. 5 is a vertical cross sectional view schematically illustrating the blow mold after the preform mold is removed.
Figure 6:
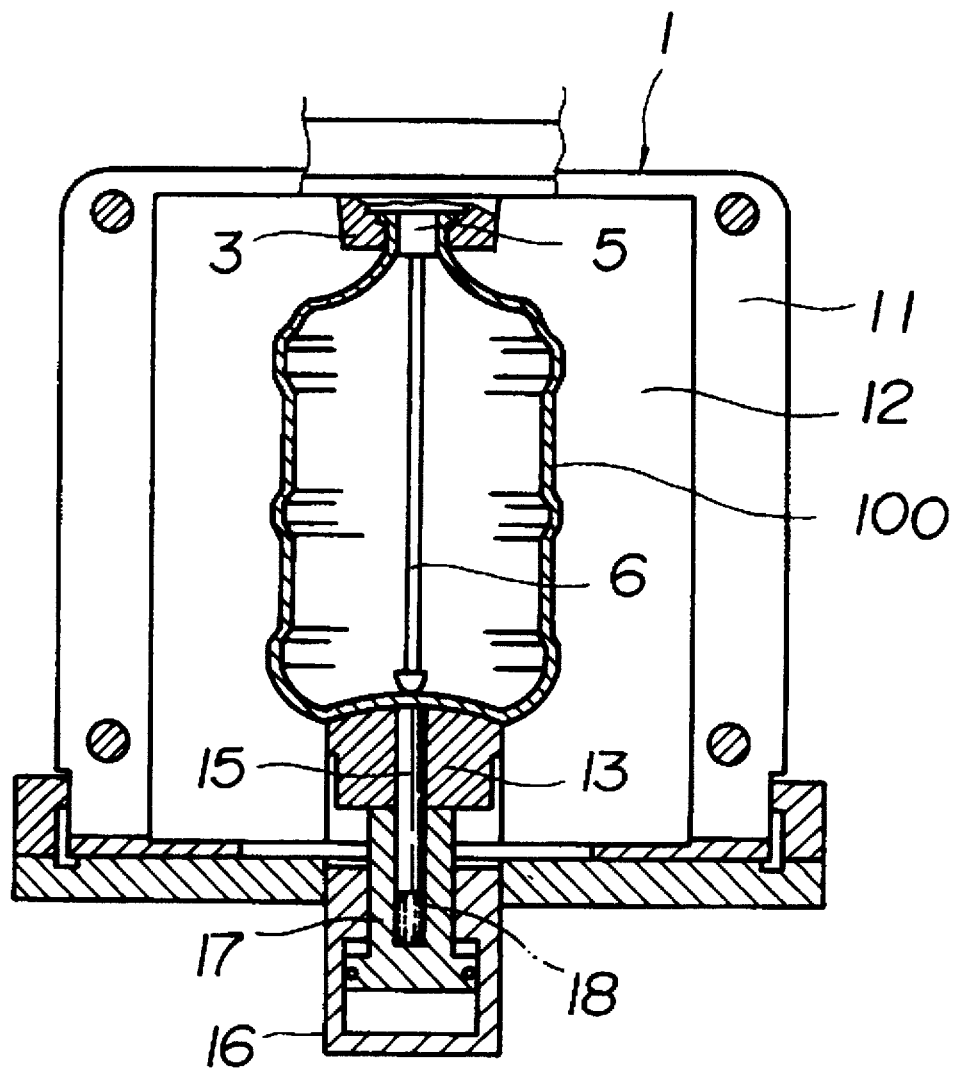
FIG. 6 is a vertical cross sectional view schematically illustrating a process of molding a large container with the blow mold.

FIGS. 1 through 6 illustrate an embodiment of molding device applicable to stretch blow molding of a large container according to the method of the present invention. A blow mold 1 includes mold halves 12, 12 attached inside to freely movable clamping plates 11, 11 and a vertically movable bottom mold 13. The mold halves 12, 12 have mating surfaces to conform to the shape of a cavity 14 for a large container. The mold halves 12, 12 are combined to form, at their upper ends, a receptacle 19 for a lip die 3. A support rod 15 for a preform (described later) is projected from the center of the bottom mold 13 in such a manner as to allow vertical movement for protrusion and withdrawal. The support rod 15 is held by a spring member 18 incorporated in a plunger 17 of an elevating mechanism 16 as shown in FIGS. 4 through 6.

A closed-end parison 2 prepared by the process of injection molding is shifted to a position above the blow mold 1 while a neck of the closed-end parison 2, which has been solidified, is held by the lip die 3. The closed-end parison 2 is moved down by a transfer plate 4 to be placed in the center of the mold halves 12, 12 in the open state. A blow core 5 and a stretch rod 6 run through the lip die 3 and the transfer plate 4 received in the receptacle 19 at the upper end of the blow mold 1 in the closed state and are inserted downward into the closed-end parison 2 as illustrated in FIG. 4.

A preform mold 7 used for molding the closed-end parison 2 into a preform is attached to a movable board 81 of a horizontally reciprocating unit 8 placed on a base on the side of the blow mold 1. The movable plate 81 is disposed upright on a front end of a movable bottom plate 83, which is guided by a guide rail on a table 82 for advance and retreat. The movable plate 81 is linked with an end of a movable rod 86 of a hydraulic driving unit 85 via a member 84 on the movable bottom plate 83. Support shafts 87, 87 are horizontally extended over upper and lower ends of front surface. A pair of upright support plates 88, 88 are attached to both ends of the support shafts 87 to allow a pivotal movement about a base end, and continuously pressed outward by a spring member 89 spanned across the support plates 88, 88 and in the vicinity of the support shafts 87.

Frames 90, 90 are further arranged inside the pair of support plates 88, 88. Mold halves 71, 71 of the preform mold 7 are fitted in the frames 90, 90, where a pair of thermal insulating boards 91, 91 are positioned between the mold halves 71, 71 and the pair of support plates 88, 88.

The mold halves 71, 71 have mating surfaces to conform to the shape of a cavity 72. The mold halves 71, 71 are combined to form, at their upper end, a receptacle 73 for receiving the lip die 3, where the receptacle 73 is placed at the same height as the receptacle 19 of the blow mold 1. An aperture 74, in which the support rod 15 is inserted and fitted, is formed on the bottom center of the mold halves 71, 71.

As shown in FIG. 2, the mold halves 71, 71 of the preform mold 7 in the open state are moved horizontally with the pair of support plates 88, 88 and inserted between the mold halves 12, 12 of the blow mold 1 in the open state. The mold halves 71, 71 of the preform mold 7 are pressed inward against the force of the spring member 89 and closed by taking advantage of the force applied to close the blow mold 1 and transmitted to press the support plates 88, 88 inward. The mating surface of the mold halves 71, 71 accordingly form the shape of the cavity 72 of a preform 10.

Release of the closing force by opening the blow mold 1 allows the mold halves 71, 71 of the preform mold 7 to be automatically opened by means of the spring member 89 and to be movable, in the open state, outside the blow mold 1 by the reciprocating unit 8.

A typical process of stretch blow molding a large container with the molding device thus constructed is described hereinafter.

A closed-end parison 2 having a wall portion to be stretched of approximately 10 mm in thickness and a shorter length than a final large container is prepared by injection molding a polycarbonate. The closed-end parison 2 under the high-temperature condition is released from an injection mold and a core mold (not shown) while a neck of the parison 2, which has been solidified, is held by the lip die 3. Immediately after the release, the closed-end parison 2 is shifted with the lip die 3 by means of the transfer plate 4 to be positioned above the blow mold 1 in the open state.

After completion of the shift, the preform mold 7 heated to 140° to 150° C. is horizontally advanced with the pair of support plates 88, 88 and inserted between the mold halves 12, 12 of the blow mold 1 (see FIG. 2).

The closed-end parison 2 is lifted down with the lip die 3 and the transfer plate 4 to be positioned between the mold halves 12, 12. The blow mold 1 is temporarily closed, so that the preform mold 7 is closed and pressed via the mold halves 12, 12 of the blow mold 1 as illustrated in FIG. 3. The closing force allows the support rod 15 projected from the bottom mold 13 to be fitted and received in the aperture 74 formed on the bottom of the preform mold 7.

After the closing of the preform mold 7, the blow core 5 and the stretch rod 6 are inserted downward through the transfer plate 4 and the lip die 3 into the closed-end parison 2 as illustrated in FIG. 4. This allows the closed-end parison 2 to be stretched in an axial direction by the stretch rod 6 and expanded by application of air blown pressures. Air is blown in repeatedly and intermittently, whereas the stretch in the axial direction is implemented only in the process of first air blow. The stretch in the axial direction allows the bottom of the closed-end parison 2 to be securely held between the stretch rod 6 and the support rod 15.

The air pressure of approximately 2 kg is blown intermittently 4 through 6 times. After each application of air blow pressure, the blown air is released by the removal of internal pressure and each expanded part is accordingly contracted back to some extent. It is essential to set an extremely short air blow time for preventing localized extreme expansion. The final air blow time is set relatively long, for example, approximately 4 seconds, in order to expand the whole parison 2 to the shape of the cavity 72. The cylindrical preform 10 having a wall thickness of approximately 5 mm subsequently undergoes the stretch blow molding process to form a final large containers.

After the molding of the preform 10 is concluded, the blow mold 1 is opened and the pressing force to the mold halves 71, 71 of the preform mold 7 is removed. The mold halves 71, 71 automatically open by means of the spring pressure while the preform 10 is kept at its molding position. The preform mold 7 is then retreated horizontally by means of the reciprocating unit 8 and returned to the position on the side of the blow mold 1. In this state, the preform 10 is supported by the support rod 15 to be positioned on the center of the blow mold 1 as illustrated in FIG. 5. This effectively prevents a draw-down of the preform 10 due to the heat held in the preform 10.

The blow mold 1 is closed and pressed again, so that the preform 10 is stretched in the axial direction by the stretch rod 6 and expanded by application of air blow pressures. The air blowing process includes a primary low-pressure step and a secondary high-pressure (8 kg or higher) step. Simultaneously with or otherwise after the expansion of the preform 10 by the secondary high pressure, the bottom mold 13 is lifted up to define a bottom mold 13 allows the support rod 15 to be accommodated in the bottom mold 13 against the force of the spring member 18 and gives a large container 100 having a wall thickness of approximately 1.2 mm as the final product as illustrated in FIG. 5.

The above embodiment is only illustrative and not restrictive in any sense. There may be many modifications, alterations, and changes without departing from the scope or spirit of essential characteristics of the present invention. The scope and spirit of the present invention are limited only by the terms of the appended claims.

What is claimed is:

1. A method of molding a large container by the process of stretch blow molding, said method comprising the steps of:

injection molding a closed-end parison having a thick-walled portion to be stretched and having a length shorter than a length of the large container to be formed, said parison being injection molded within a cavity defined by an injection mold, a core mold and a lip die;

releasing said closed-end parison from the injection mold and the core mold after a skin layer is formed on a surface of said closed-end parison having a high inner temperature, a solidified neck of said closed-end parison is held by the lip die;

shifting said released closed-end parison with said lip dies to mold halves of a preform mold heated to a predetermined temperature;

receiving said closed-end parison between said mold halves of said preform mold, and closing said mold halves of said preform mold to position said closed-end parison in a center of a preform cavity, which is defined by mating surfaces of said preform mold halves;

inserting a blow core and a stretch rod downward through said lip die into said closed-end parison after closing said preform mold, so as to allow said closed-end parison to be stretched in an axial direction by said stretch rod and expanded by application of air pressure while said closed-end parison still has a high inner temperature;

repeatedly blowing in and releasing an application of low-pressure air into said closed-end parison, while implementing the stretching of the closed-end parison in the axial direction only during a first low pressure air application, a final low-pressure air application being applied for a period longer than that of the other repeated low-pressure air applications, thereby expanding said closed-end parison to fill said preform cavity to mold a predetermined preform having an intermediate size between that of said closed-end parison and said large container;

placing said preform in a blow mold; and manufacturing said large container having a thin-wall body as a final product by the process of stretch blow molding;

said preform is supported by a support member, which is withdrawn into a bottom mold by application of air pressure in the step of stretch blow molding, and support provided by said support member preventing a draw-down of said preform because of heat held in said preform.

2. A method as claimed in claim 1, wherein said step of stretch blow molding further comprises applying a primary low-pressure air blow and a secondary high-pressure air blow, so as that said preform is expanded to said large container by the secondary high pressure.

3. A method as claimed in claim 1, wherein said closed-end parison is prepared from polycarbonate by the process of injection molding and molded to a preform of a predetermined size with a preform mold heated to 140° through 150° C.

4. A method as claimed in claim 1, wherein said preform is released from said mold halves of said preform mold at a position, and at said position said preform is enclosed in the mold halves of a blow mold for manufacturing said large container.

* * * * *